Patented Feb. 6, 1951

2,540,786

UNITED STATES PATENT OFFICE 2,540,786

VASOCONSTRICTOR AMINE SALTS OF N'-ACYL SULFANILAMIDES

Frederick J. Kirchmeyer and Edmond Eugene Moore, Waukegan, Ill., assignors to Abbott Laboratories, a corporation of Illinois No Drawing. Application August 26, 1944, Serial No. 551,430

6 Claims. (Cl. 260—397.7)

This invention relates to water soluble therapeutic substances and their solutions and more specifically to products formed by the interaction of vasoconstrictive amines and a $N_1$ acyl para aminobenzenesulfonimides.

The bacteriostatic action of para aminobenzene sulfonamide (also called sulfanilamide) and a few of its derivatives, such as sulfathiazole, sulfadiazine, sulfacetimide, etc., is well known. These drugs all belong in the class commonly called sulfa drugs. They have been widely used in the treatment and prevention of many types of infections caused by coccus forms of pathogenic organisms.

Because of the limited solubilities of the sulfa drugs in liquids safe for use on living animal tissues, these drugs have been restricted chiefly to use in solid form. The drugs have been used as dry powders, tablets, ointments and jellies (which are mixtures of the solid drug with emollient vehicles), and suspensions of the solid in aqueous and other liquid media.

The aqueous suspension is unsatisfactory for several reasons. The drug, to be effective, must first be in solution. If the suspension is applied to a surface the liquid dries leaving the solid sulfa drug, which has the undesirable irritant properties of any solid foreign body. Solutions of some of the sulfa drugs have been prepared by dissolving the sodium salts in water. Since the sulfa drugs are weakly acidic their solutions are always alkaline having a pH ranging from 8.4 to 11.0. This alkalinity is irritating to delicate surfaces such as the mucous membrances of the nose and the eye.

We have found that aqueous solutions of sulfa drugs having a neutral or slightly acidic reaction may be prepared by reacting $N_1$ acyl para aminobenzene sulfonimides with vasoconstrictors having a basic salt-forming amine group to form salts. The vasoconstrictive properties of the amine are retained in the salt and are desirable in solutions of sulfa drugs for use in treatment of the nasal mucosa. The $N_1$ acyl para aminobenzene sulfonimides are compounds having the general formula:

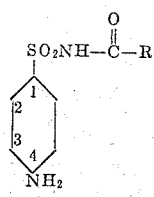

Where R is a hydrocarbon radical

The carbon atoms in the benzene ring may be numbered, as shown in the structural formula. The $N_1$ acetyl compound is known as sulfacetimide, and sold under various made names such, as Albucid, Sulamyd, etc.

Among the vasoconstrictors having a basic salt-forming amine group available for use in this invention are ephedrine, desoxyephedrine, 3,4-dihydroxyphenyl propanolamine, α-hydroxy-β methyl aminoethyl-3-hydroxybenzene and adrenalin (epinephrine). We have found that the $N_1$ acyl para aminobenzenesulfonimides react with vasoconstrictors having a basic salt-forming amine group in molecular proportions forming chemical compounds whose solutions are approximately neutral in reaction and which may be treated in such a manner as to render them even slightly acidic without precipitating the sulfa drug. For example, by the use of the ephedrine sulfacetimide compound it is possible to prepare an aqueous solution having both bacteriostatic and vasoconstrictive action and having a pH of 6.5. Sulfacetimide is soluble in water at ordinary temperatures to the extent of only about 1 per cent. The ephedrine salt has a solubility sufficient to prepare a solution containing over 10 per cent of sulfacetimide.

Several of the compounds have been isolated in solid form. In actual practice, where a solution is the desired product it is not necessary to first form the dry solid compound since solution may be effected by mixing the amine, $N_1$ acyl sulfa drug and water; or by mixing the salt of the amine and an acid, with the salt of the $N_1$ acyl sulfa drug and a base in the desired amount of water. For example, a solution may be prepared by mixing molecular proportions of ephedrine and $N_1$ acetyl p-amino benzenesulfonimide (also called sulfacetimide) with water; or by mixing ephedrine hydrochloride and sodium sulfacetimide with water.

In the compound ephedrine-sulfacetimide, the alkaloid and sulfa drug are present in the ratio of 1 part of ephedrine to 1.29 parts of sulfacetimide. In practice, it has been found desirable to have a therapeutic action in which the therapeutic effect of the sulfa drug is more pronounced, compared with the vasoconstrictive action, than is secured with the above proportion of the ephedrine sulfacetimide compound. Specifically, the range for desirable vasoconstrictive action is from about one half to about one per cent of ephedrine, and the range for desirable sulfa drug action is from about 2½% to 5%, with a ratio of about 5 to 1 between sulfa drug and vasoconstrictor.

We have discovered that in the presence of a given concentration of vasoconstrictor combined with sulfa drug in chemically equivalent proportions, the desired additional sulfa drug can be included in the form of the sodium salt, and at the same time pH which is neutral or even slightly acid can be maintained without precipitating anything. This has not been possible with therapeutic products previously known in the art. If solutions were desired containing an effective concentration of a sulfa drug it was necessary to make them alkaline to a pH of at least 8.4 and this alkalinity is irritating to mucous surfaces.

The solid compounds formed by reaction between molecular proportions of the sulfa drug and vasoconstrictive amine may be isolated in pure form as illustrated by Example I.

Example I

A solution of 1.07 grams (0.005 mol) of sulfacetimide in 10 cc. of methyl alcohol was united with a solution of 0.825 grams of ephedrine alkaloid in 10 cc. of methyl alcohol. The alcohol was removed by distillation on a water bath. The residue did not crystallize spontaneously or on standing for some time. This gummy material was taken up in about 15 cc. of ethyl acetate by warming. On cooling the ephedrine sulfacetimide compound which crystallized contained ethyl acetate of crystallization, the crystals having the following composition:

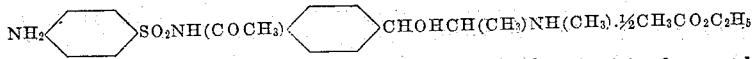

The ethyl acetate of crystallization may be removed by heating at 78° C. under a pressure of 40 mm. The resulting compound ephedrine sulfacetimide melted at 78° C. and its composition was verified by analysis.

In a similar manner there may be prepared pseudo ephedrine sulfacetimide having a melting point of 72–74° C.; and desoxyephedrine sulfacetimide having a melting point of 65–67° C.

In place of sulfacetimide there may be used other sulfa drugs which have the acetyl group of sulfacetimide replaced by another acyl group such as propionyl and acryloyl.

In place of ephedrine there may be used another vasoconstrictive amine such as desoxyephedrine, α - hydroxy - β - methylaminoethyl-3 - hydroxybenzene, 3,4 - dihydroxy phenylpropanolamine, and adrenalin (also called epinephrine).

Example II

Ephedrine salt of sulfacetimide, 2.29 grams
Distilled water to make 100 cc.

Mix the solid previously prepared salt with 95 cc. water and dissolve, expediting solution by agitation or gentle warming, if desired. Dilute this solution to 100 cc. with distilled water. Sufficient sodium chloride to make this solution isotonic may be added thereby eliminating the possibility of any stinging sensation which sometimes accompanies application if non-isotonic solutions to mucous surfaces. Since this solution contains no antioxidant, it should be used within a few days after being prepared.

Example III

| | Grams |
|---|---|
| Sulfacetimide | 1.29 |
| Ephedrine alkaloid | 1.00 |
| Distilled water to make 100 cc. | |

Take up the ingredients in most of the water and then make up to full volume. It is possible to prepare solutions of fifteen times the above concentration, but a concentration of one half to one per cent ephedrine and two and one half to five per cent sulfacetimide has been found most satisfactory.

Where a larger proportion of N₁ acyl sulfa drug is desired, this may be supplied by using the sodium salt of the sulfa drug along with the ephedrine salt of the sulfa drug as illustrated in the following examples.

Example IV

| | Grams |
|---|---|
| Sulfacetimide | 4.514 |
| Ephedrine sulfate | 2.0 |
| Sodium hydroxide U. S. P | 0.84 |
| Sodium thiosulfate | 0.20 |
| Distilled water, q. s. 200.00 cc. | |

Dissolve the sodium hydroxide in 185 cc. of distilled water, add the sulfacetimide, and when it has dissolved, add the ephedrine sulfate. In this solution dissolve the sodium thiosulfate and finally add sufficient distilled water to make 200 cc. This solution is isotonic and has a pH of 6.4.

Example V

| | Grams |
|---|---|
| Sulfacetimide | 4.514 |
| Sodium hydroxide | 0.84 |
| Ephedrine sulfate | 1.0 |
| Methyl para-hydroxybenzoate | 0.10 |
| Sodium chloride | 0.336 |
| Sodium thiosulfate | 0.20 |
| Distilled water, q. s. 200.0 cc. | |

First dissolve the methyl para-hydroxybenzoate in 185 cc. of water by aid of heat. Then add the other ingredients in the order named waiting until each one has dissolved before adding the next. Finally, add enough water to make 200 cc. of solution. This solution is isotonic and has a pH of 6.4.

Example VI

| | Grams |
|---|---|
| Sulfacetimide | 4.514 |
| Sodium hydroxide | 0.84 |
| Desoxyephedrine hydrochloride | 1.0 |
| Methyl para-hydroxybenzoate | 0.10 |
| Sodium chloride | 0.336 |
| Sodium thiosulfate | 0.20 |
| Distilled water, q. s. 200.0 cc. | |

The solution is prepared by the same procedure as in Example IV and the resulting product is isotonic and has a pH of 6.39.

Example VII

| | Grams |
|---|---|
| Sulfacetimide | 9.028 |
| Sodium hydroxide | 1.68 |
| Ephedrine sulfate | 2.0 |
| Methyl para-hydroxybenzoate | 0.1 |
| Sodium meta bisulfite | 0.20 |
| Distilled water, q. s. 200.0 cc. | |

Prepare the solution according to directions in Example V. This solution is slightly hypertonic and has a pH of 6.5. It contains both the ephedrine salt and the sodium salt of sulfacetimide.

Reducing agents, such as sodium thiosulfate and sodium meta bisulfite are used to prevent oxidation of sulfacetimide into harmful compounds, which oxidation is evidenced by the appearance of discoloration. Methyl para-hydroxybenzoate is used as a preservative to prevent mold growth. Sodium chloride is used to make solutions isotonic. Coloring or flavoring agents may be added as desired.

Without further elaboration the foregoing will so fully explain our invention that others may readily adapt it for use under various conditions of service. For instance, in the examples given, the solubility of the ephedrine, as well as that of the sulfa drug, is increased. Thus, for special purposes, it would be possible to prepare ephedrine solutions of higher ephedrine concentration than can be made up in water, although the concentrations commonly employed on living human beings are not high enough to make use of this feature.

We claim:

1. As a new chemical compound, a salt of an $N_1$-acyl-para-aminobenzenesulfonimide, said acyl group being selected from the class consisting of acetyl, propionyl and acryloyl, and a vasoconstrictor selected from the class consisting of ephedrine; desoxyephedrine; 3,4-dihydroxyphenyl propanolamine; $\alpha$-hydroxy-$\beta$-methyl aminoethyl-3-hydroxybenzene, and adrenalin, said salt being characterized by bacteriostatic and vasoconstrictive properties, and further characterized by its water solubility, the aqueous solutions of said salt having a pH approaching the neutral point.

2. As a new chemical compound, a salt of $N_1$-acetyl para-aminobenzenesulfonimide and the vasoconstrictor 3,4-dihydroxyphenyl propanolamine.

3. As a new chemical compound, a salt of $N_1$-acetyl-para-aminobenzenesulfonimide and the vasoconstrictor $\alpha$-hydroxy-$\beta$-methyl aminoethyl-3-hydroxybenzene.

4. As a new chemical compound, a salt of $N_1$-acetyl-para-aminobenzenesulfonimide and the vasoconstrictor adrenalin.

5. As a new chemical compound, the ephedrine salt of $N_1$-acetyl-para-aminobenzenesulfonimide.

6. As a new chemical compound, the desoxyephedrine salt of $N_1$-acetyl-para-aminobenzenesulfonimide.

FREDERICK J. KIRCHMEYER.
EDMOND EUGENE MOORE.

REFERENCES CITED

The following references are of record in the file of this patent:

UNITED STATES PATENTS

| Number | Name | Date |
| --- | --- | --- |
| 2,298,630 | Shelton | Oct. 13, 1942 |
| 2,345,385 | Dohrn | Mar. 28, 1944 |
| 2,361,624 | Hamilton et al. | Oct. 31, 1944 |
| 2,369,711 | Blythe | Feb. 20, 1945 |
| 2,385,262 | Curtis | Sept. 18, 1945 |
| 2,389,582 | Winnek | Nov. 20, 1945 |
| 2,411,495 | Dohrn et al. | Nov. 19, 1946 |
| 2,478,191 | Hamilton et al. | Aug. 9, 1949 |

FOREIGN PATENTS

| Number | Country | Date |
| --- | --- | --- |
| 111,230 | Australia | Aug. 22, 1940 |

OTHER REFERENCES

Chemical Abstracts, vol. 22 (1928), page 4175.

Tozer et al.: Journ. A. P. A., Scientific Sec., July 1941, pp. 189–191.

Gundrum: Archives of Otolaryngology, Feb. 1943, as abstracted in Jour. A. M. A., May 22, 1943, p. 256.

Jour. Am. Pharm. Assoc. (Prac. Pharm. Ed.), April 1943, page 130.

Turnbull et al.: Journ. Amer. Med. Assn., Oct. 30, 1943, pp. 536–537.

Green: Journ. A. P. A., Prac. Pharm. Ed., Feb. 1944, pp. 28, 30.